(12) United States Patent
Reshad et al.

(10) Patent No.: US 8,857,924 B2
(45) Date of Patent: Oct. 14, 2014

(54) LUGS OF CONTINUOUS RUBBER TRACKS FOR TRACK VEHICLES

(75) Inventors: Jamsheed Reshad, Newburgh, IN (US); Duane Tiede, Naperville, IL (US)

(73) Assignee: ATI, Inc., Mt. Vernon, IN (US)

( * ) Notice: Subject to any disclaimer, the term of this patent is extended or adjusted under 35 U.S.C. 154(b) by 576 days.

(21) Appl. No.: 12/788,906

(22) Filed: May 27, 2010

(65) Prior Publication Data

US 2011/0291473 A1 Dec. 1, 2011

(51) Int. Cl.
*F16H 55/48* (2006.01)
*B62D 55/24* (2006.01)

(52) U.S. Cl.
CPC .................................. *B62D 55/244* (2013.01)
USPC .......................................... 305/194; 305/160

(58) Field of Classification Search
USPC .......... 305/160–162, 180, 193–195, 198, 201
See application file for complete search history.

(56) References Cited

U.S. PATENT DOCUMENTS

| | | | |
|---|---|---|---|
| 5,540,489 A * | 7/1996 | Muramatsu et al. | 305/197 |
| 5,707,123 A * | 1/1998 | Grob | 305/169 |
| 5,829,848 A | 11/1998 | Kelderman | |
| RE36,284 E | 8/1999 | Kelderman | |
| 5,984,438 A * | 11/1999 | Tsunoda et al. | 305/169 |
| 6,030,057 A * | 2/2000 | Fikse | 305/181 |
| 6,120,405 A * | 9/2000 | Oertley et al. | 474/156 |
| 6,386,654 B1 | 5/2002 | Singer et al. | |
| 6,536,854 B2 | 3/2003 | Juncker et al. | |
| 6,540,310 B1 | 4/2003 | Cartwright | |
| 6,543,861 B1 | 4/2003 | Kahle et al. | |
| 6,543,862 B1 | 4/2003 | Kahle et al. | |
| 6,557,953 B1 | 5/2003 | Kahle et al. | |
| 7,347,512 B2 | 3/2008 | Dandurand | |
| 7,625,050 B2 | 12/2009 | Bair | |

FOREIGN PATENT DOCUMENTS

| | | |
|---|---|---|
| JP | 2004322866 A2 | 11/2004 |
| JP | 2008056125 A2 | 3/2008 |
| WO | WO2008071011 A | 6/2008 |

* cited by examiner

*Primary Examiner* — Jason Bellinger
(74) *Attorney, Agent, or Firm* — Jansson Munger McKinley & Shape Ltd.

(57) ABSTRACT

A continuous flexible track for extending about a plurality of aligned wheels on a vehicle or track module, the track includes an outer ground-engaging surface and an inner wheel-engaging surface having inwardly-projecting wheel-engaging lugs. Each lug has a proximal end, a distal surface, front and back surfaces and opposite side surfaces. Each lug further includes a flex-groove extending between the side surfaces and from the distal surface toward the proximal end, thereby dividing the lug into two portions to allow around-wheel hinging motion. In most preferred embodiments, a lug-receiving cap may be positioned over and replaceably secured with respect to each lug. A method for prolonging the useful life of such a track is provided.

18 Claims, 13 Drawing Sheets

LUGS OF CONTINUOUS RUBBER TRACKS FOR TRACK VEHICLES

FIELD OF THE INVENTION

The invention relates generally to the field of track systems for vehicles and more particularly to rubber tracks of the continuous type having integrally formed lugs along their inner surface, which inner surface engages various wheels, most typically including a large upper wheel, e.g., drive wheel, and various lower ground-adjacent idler wheels. Still more particularly, this invention relates to the field of covers for lugs on rubber tracks.

BACKGROUND

Track-type vehicles are commonly used for moving earth or the like in applications requiring high mobility, for example in road construction or for agricultural purposes. Such track-type vehicles include a continuous flexible (e.g., rubber) track which extends about a plurality of wheels. The track includes an outer surface which engages the ground and an inner surface having lugs (sometimes referred to as drive lugs) which engage the drive wheels, idler wheels and bogey wheels, for example. Use places enormous strain on the mechanics of the track apparatus, particularly with respect to the flexible track and the lugs thereon.

The Achilles heel of flexible tracks for such track-type vehicles is the lug which comes into direct contact with the wheels, usually including a large drive wheel, with all or much of the forces of the track apparatus being exerted on the track lugs. Two particular problems with conventional lugs are side loading and over-torque. With normal wear, the lugs will begin to degrade and be chipped or otherwise worn by virtue of lateral forces applied on the track. Track-driven systems generally resist lateral motion, but such forces (and other forces) are present in normal use of the track apparatus. When a lug wears down, the track wear allows the continuous flexible track to shift laterally. As a result, the track will ride more toward the edges of the lug that have worn down and this will continue to wear down such lug edges.

Another challenge with conventional lugs is finding a balance between strength and flexibility. Improved strength and durability are highly desirable, but where flexibility is sacrificed the useful life of the lugs is severely limited. The lugs need to be durable, but also need to have the flexibility to allow them to bend or flex around the smaller radii of the smaller (typically lower) wheels.

Because the lugs are susceptible to mechanical damage, side loading and over-torque, there is a need for an improved lug that has enhanced durability without sacrificing highly desirable flexibility. There is also a need for an improved lug with an increased useful life, thereby reducing the need for replacement of a lug, or the entire track. There is a further need for an improved lug that will minimize wear from lateral forces on the belt and thereby increase the useful life of each lug.

OBJECTS

It is an object of the invention to provide an improved lug of continuous rubber tracks for track vehicle overcoming some of the problems and shortcomings of the prior art, including those referred to above.

Another object of the invention is to provide an improved lug that has enhanced durability without sacrificing flexibility.

Another object of the invention is to provide an improved lug with an increased useful life, reducing the need for replacement of the track and individual lugs.

Still another object of the invention is to provide a lug which minimizes wear from lateral forces on the belt and thereby increases the useful life of the belt.

Yet another object of the invention is to provide a cap for an improved lug to further extend the useful life of each lug.

Still another object of the invention is to provide a lug and cover therefor which are attached in a way that maintains the integrity of the track.

How these and other objects are accomplished will become apparent from the following descriptions and the drawings.

BRIEF SUMMARY

In accordance with the present invention, a continuous flexible track having improved guide lugs is provided. The improvement overcomes certain problems and shortcomings of the prior art, including those noted above, and provides a unique structure satisfying a number of specific needs.

In embodiments, a continuous flexible track for extending about a plurality of aligned wheels on a vehicle or track module is provided. The track includes an outer ground-engaging surface and an inner wheel-engaging surface having inwardly-projecting wheel-engaging lugs. Each lug has a proximal end, a distal surface, front and back surfaces and opposite side surfaces. The lug defines a flex-groove which extends between the side surfaces of the lug and from the distal lug surface toward the proximal end, thereby dividing the lug into two portions. Such preferred embodiments, thus, allow around-wheel hinging motion. Also in highly preferred embodiments, a lug-receiving cap is positioned over and is replaceably secured with respect to each lug.

In certain embodiments, each lug has a height and the flex-groove extends toward the proximal end by a distance such that the depth of the flex-groove is from about 30% to about 90% of the lug height. In preferred embodiments, the depth of the flex-groove is from about 50% to about 80% of the lug height.

In certain highly preferred embodiments the lug-receiving cap is secured with respect to the lug by mechanical means. Such mechanical means may include a bolt and a bolt-receiving insert which extends through the lug from one side to the other. In such embodiments, the lug-receiving cap has side surfaces which are recessed to accommodate the bolt.

In other embodiments, the mechanical means may include a molded-in member which has securement rods extending toward the distal surface. In preferred embodiments, the securement rods may extend through the proximal end of the lug and through the inner surface of the track and terminate in a molded-in anchor member in the track. The anchor member may be positioned between a main longitudinal cable in the track and a cable ply in the track. In other preferred embodiments, the molded-in member may be a U-shaped member. The U-shaped member may be molded into one of the portions of the lug in an orientation that is substantially parallel to the flex-groove. The U-shaped member may have ends which extend to the distal surface. Still in such preferred embodiments, the lug-receiving cap may have recessed openings which access the U-shaped member ends and securement devices are at the recessed openings to engage the ends of the U-shaped member.

In certain other embodiments of the continuous flexible track, the lug-receiving cap may be secured directly to one of the two lug portions, thereby facilitating the hinging motion within the cap.

In preferred embodiments, the lug-receiving cap is formed from a material including at least one thermoplastic elastomer.

Also provided is a method of prolonging the useful life of a continuous flexible track for extending about a plurality of aligned wheels on a vehicle or track module. Such method includes the step of forming a track having lugs including an outer ground-engaging surface and an inner wheel-engaging surface having inwardly-projecting wheel-engaging lugs. Each lug has a proximal end, a distal surface, front and back surfaces and opposite side surfaces. Further, each lug defines a flex-groove extending between the side surfaces and from the distal surface toward the proximal end, thereby dividing the lug into two portions to allow around-wheel hinging motion. The method further includes placing a lug-receiving cap over each lug and replaceably securing it with respect to its respective lug. Then, after a period of track use, the method includes detaching and replacing the lug-receiving cap with a new lug-receiving cap when the cap is worn or damaged. In such a method, the lug-receiving cap may be formed from a material including at least one thermoplastic elastomer, as described above in connection with the continuous flexible track apparatus.

DETAILED DESCRIPTION

Prior track apparatus for vehicles are disclosed in U.S. Pat. Nos. RE36,284 (Kelderman), 5,829,848 (Kelderman), 6,536,854 (Kahle et al.), 6,543,861 (Kahle et al.), 6,543,862 (Kahle et al.) and 6,557,953 (Kahle et al.), assigned to the assignee of the present invention, and are incorporated herein by reference. The invention is an improvement in the flexible tracks of the type referred to in such patents, has application in positive drive systems, friction drive systems, gliding systems (in which power is not transferred to the track from one of the wheels engaging the track) and combination systems.

Figure 1:
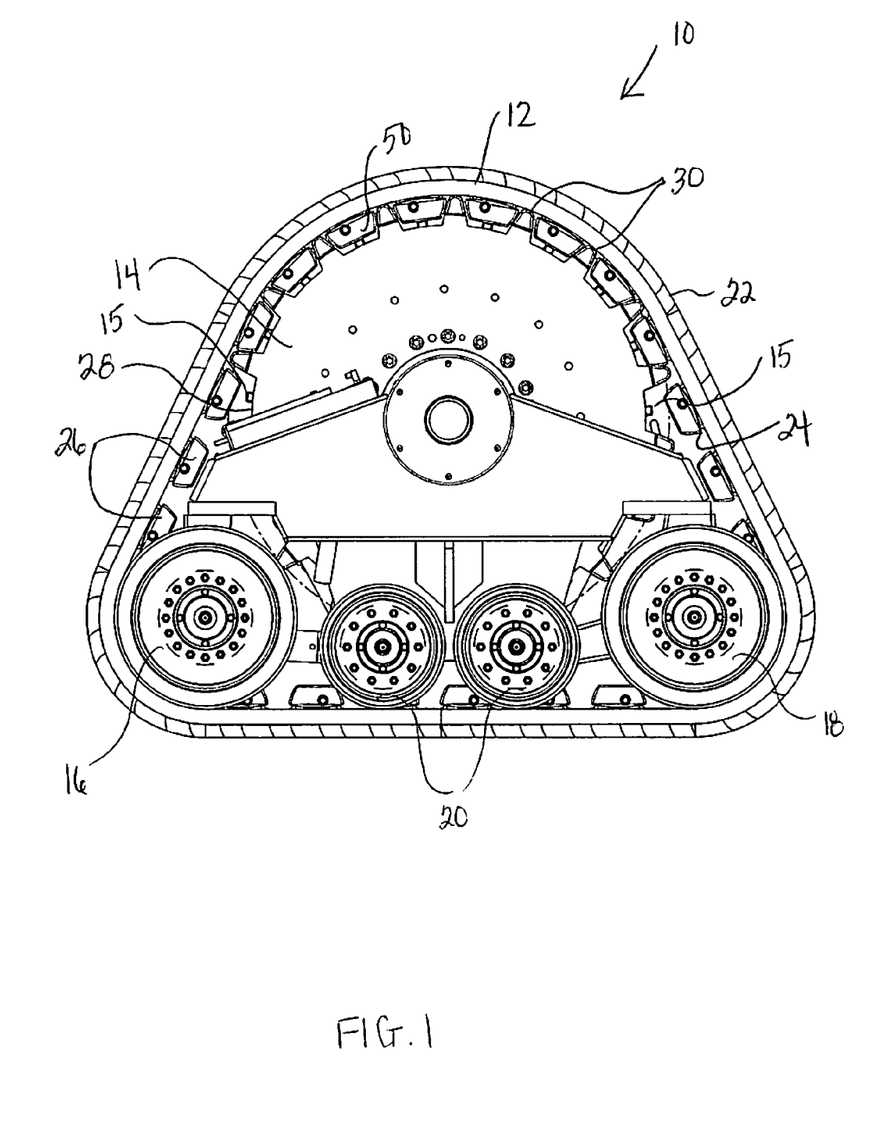
FIG. 1 is a side elevational view of a track module.

Referring first to FIG. 1, a track module 10 is shown. In a preferred embodiment, the track module 10 is mounted on an axle (not shown) of an agricultural or construction (or other earth-moving) vehicle. However, other types of vehicles, such as trucks, automobiles and the like are considered as being within the scope of the present invention.

The track module includes a continuous flexible track 12 which extends about a plurality of aligned wheels, which may include, for example, a drive wheel 14, idler wheels 16, 18 and bogey wheels 20. As is apparent, flexible track 12 is in the form of a continuous loop. Drive wheel 14 is mountable to an axle of a vehicle for rotational movement therewith in order to drive flexible track 12, and thus the vehicle.

Still referring to FIG. 1, flexible track 12 includes an outer ground-engaging surface 22 and an inner wheel-engaging surface 24 having inwardly-projecting wheel-engaging lugs 26, which are circumferentially spaced about inner surface 24 of track 12. Drive wheel 14 is engaged with inner surface 24 of continuous flexible track 12, including lugs 26 thereon. FIG. 1 shows that the outer surface 28 of drive wheel 14 may include circumferentially spaced drive members 30 (such as teeth, drive or sprocket pins or the like) which project radially therefrom. Drive wheel 14 may include outwardly-facing lug-engagement surfaces 15 which are positioned for engagement with distal ends 34 of lugs 26 such that each lug 26 is supported when driven by drive wheel 14. Engagement of lugs 26 with outwardly-facing lug-engagement surfaces 15 of drive wheel 14 tends to minimize shearing forces on lugs 26 and the possible turning and twisting of such lugs. Flexible track 12 is positioned over drive wheel 14 such that lugs 26 projecting from inner surface 24 of track 12 are received between corresponding pairs of drive members 30 projecting from the outer surface 28 of drive wheel 14. A pair of leading and trailing idler wheels 16, 18 are engaged with track 12 and lugs 26 projecting from inner wheel-engaging surface 26 of track 12. The outer surfaces of idler wheels 16, 18 engage inner surface 24 of flexible track 12, including lugs 26. Bogey wheels 20 ride over track 12.

Figure 2:
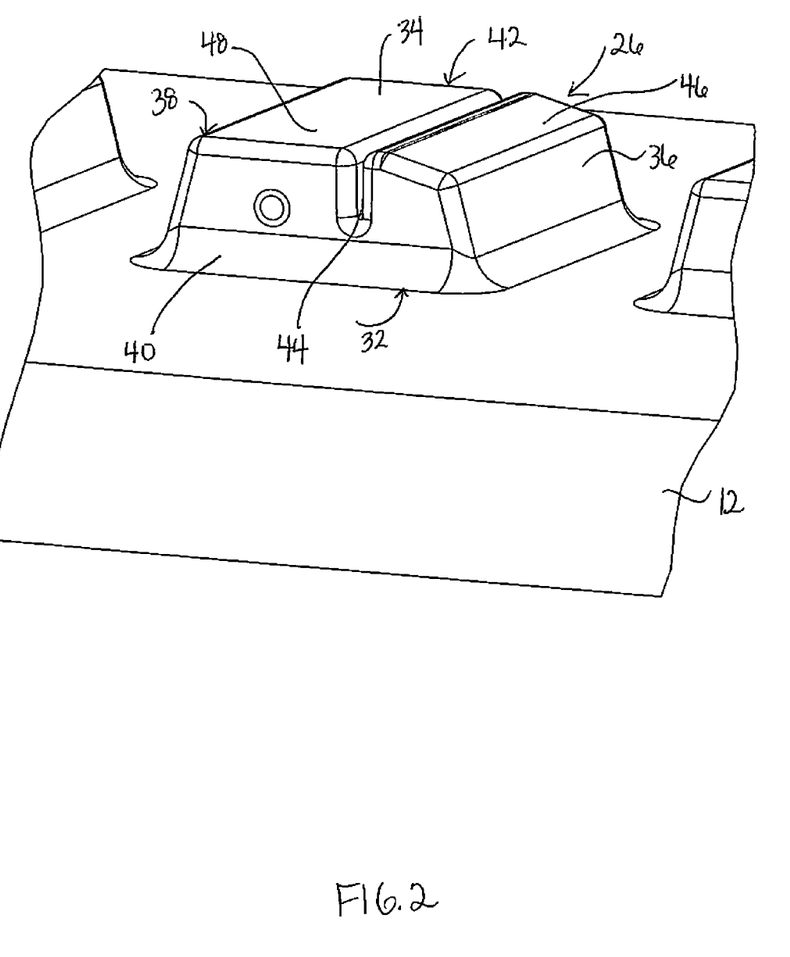
FIG. 2 is a partial view of the track of FIG. 1 showing a front perspective view of a wheel-engaging lug of FIG. 1 with the lug-receiving cap removed.
Figure 3:
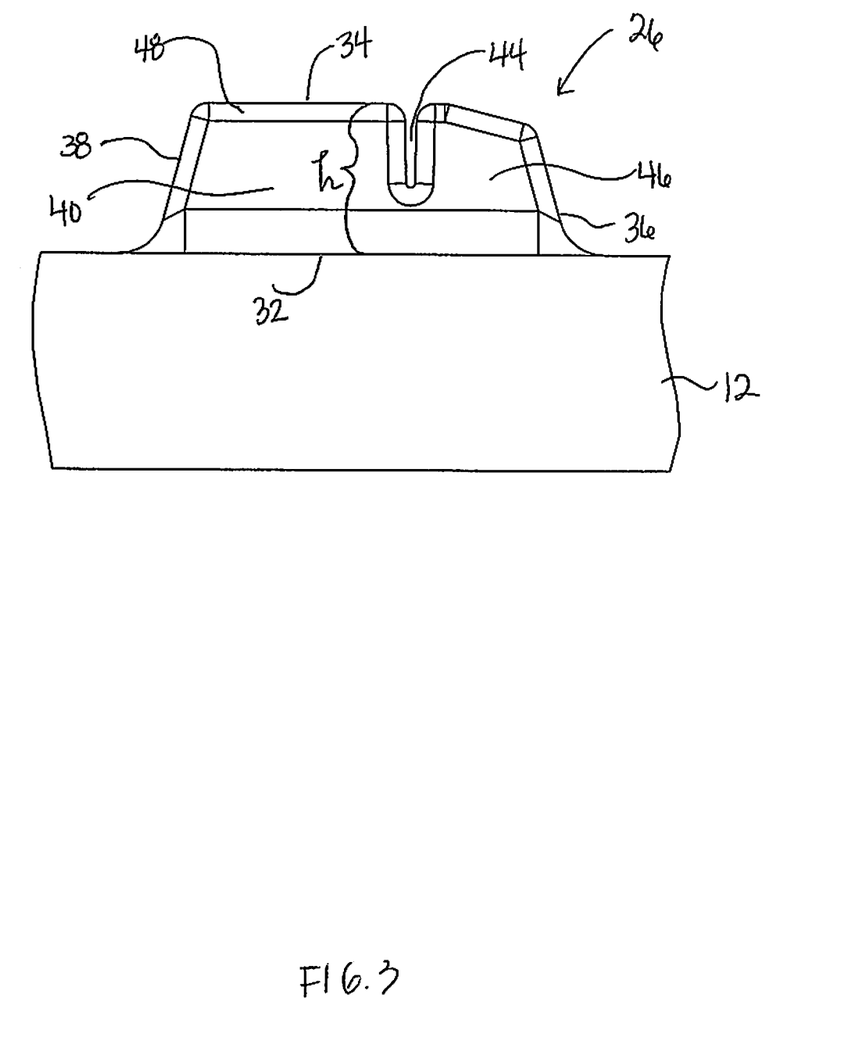
FIG. 3 is a partial view of the track of FIG. 1 showing a side view of a wheel-engaging lug of FIG. 1.
Figure 4:
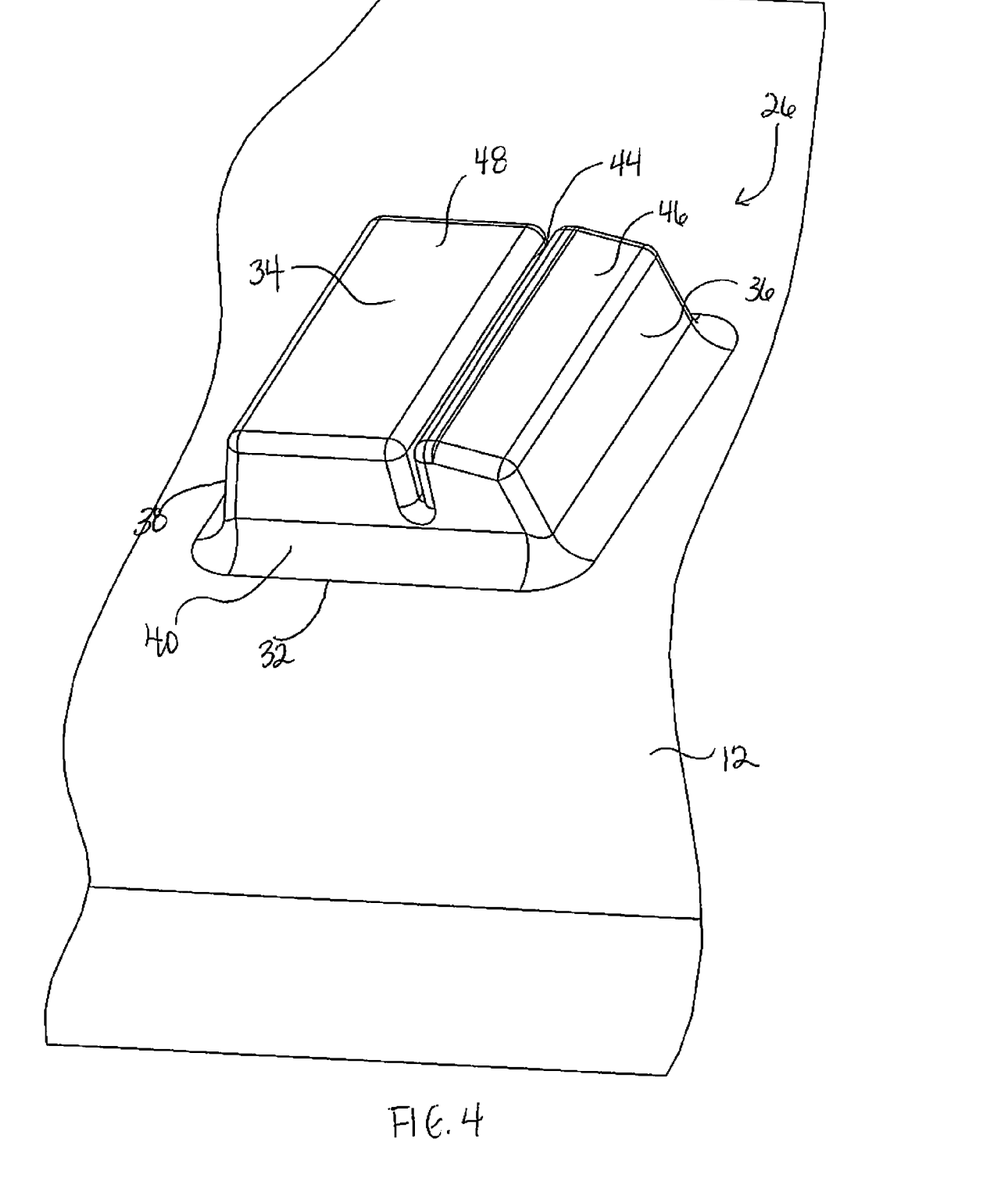
FIG. 4 is a top perspective view of the wheel-engaging lug of FIG. 3.

As best illustrated in FIGS. 2-4, each lug 26 has a proximal end 32, a distal surface 34, front and back surfaces 36, 38 respectively and opposite side surfaces 40, 42. Each lug 26 defines a flex-groove 44 which extends across the width of track 12 between side surfaces 40, 42 and from distal surface 34 toward proximal end 32 to divide lug 26 into a leading and a trailing portion, 48, 46 respectively. Portions 46, 48 may be of equal sizes, in which case flex-groove 44 is positioned in the center of lug 26. Or, flex-groove 44 may be positioned off-center so that one portion has a larger dimension than the other portion. As shown, trailing portion 46 of lug 26 may have a greater dimension than leading portion 48 of lug 26. Flex-groove 44 permits around-wheel hinging motion which increases the useful life of track 12. As lugs 26 travel about drive wheel 14 and idler wheels 16, 18, flex-groove 44 facilitates around-wheel hinging motion of lugs 26. Flex-groove 44 allows lug 26 to wrap around the circumference of drive wheel 14 and the smaller diameter of idler wheels 16, 18.

Referring next to FIG. 3, each lug 26 has a height (h) and flex-groove 44 extends from distal end 34 of lug 26 toward proximal end 32 by a variable distance. The height may vary, for example, according to the diameter of drive wheel 14 or idler wheels 16, 18 or how long lug 26 is along the circumference of track 12. The depth of flex-groove 44 is preferably between 50% and 80%. As shown, for example, the depth is about 54% lug height (h). The height of lug 26 must be sufficient to allow parts 46 and 48 to join. Of course, the height of flex-groove 44 is sufficient provided it is enough to facilitate the around-wheel hinging motion, but not so great that it weakens the stability of lug 26. The width of flex-groove 44 may depend, for example, upon the height of flex-groove 44.

As shown in FIGS. 1 and 5-9, in certain highly preferred embodiments a lug-receiving cap 50 is placed over lug 26. Lug-receiving cap 50 may be removably and replaceably secured with respect to lug 26. In certain embodiments, lug-receiving cap 50 may be secured directly to one of two lug portions 46, 48 to facilitate the hinging motion within cap 50. Securement may be by bonding or mechanical means, or any other suitable means of attachment. Examples of suitable mechanical means may include, for example, a screw, a bolt-receiving insert, a bolt, a molded-in insert, a U-bolt or other suitable mechanical devices. More than one mechanical means may be used to secure cap 50 with respect to lug 26.

Figure 5:
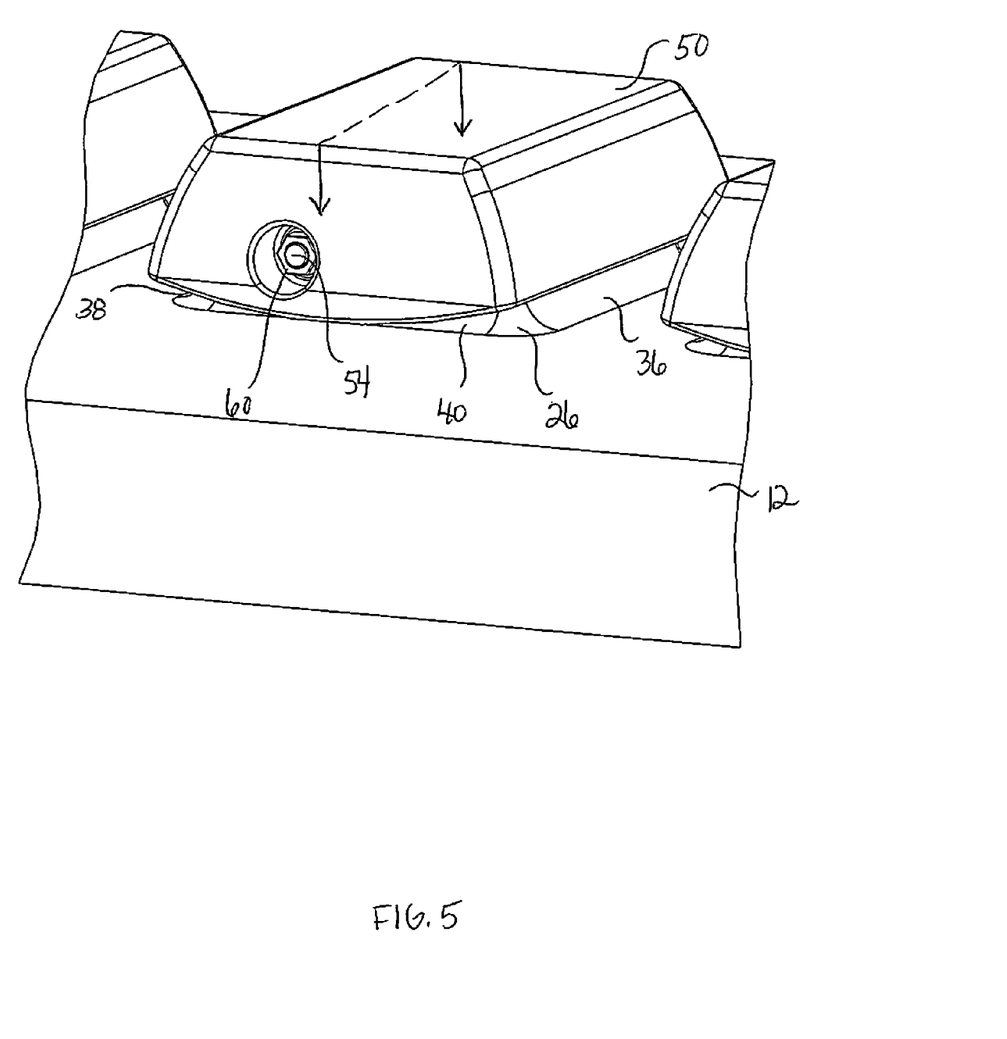
FIG. 5 is a side perspective view of a wheel-engaging lug of FIG. 1 with a lug-receiving cap secured to the lug by a bolt and bolt-receiving insert.
Figure 6:
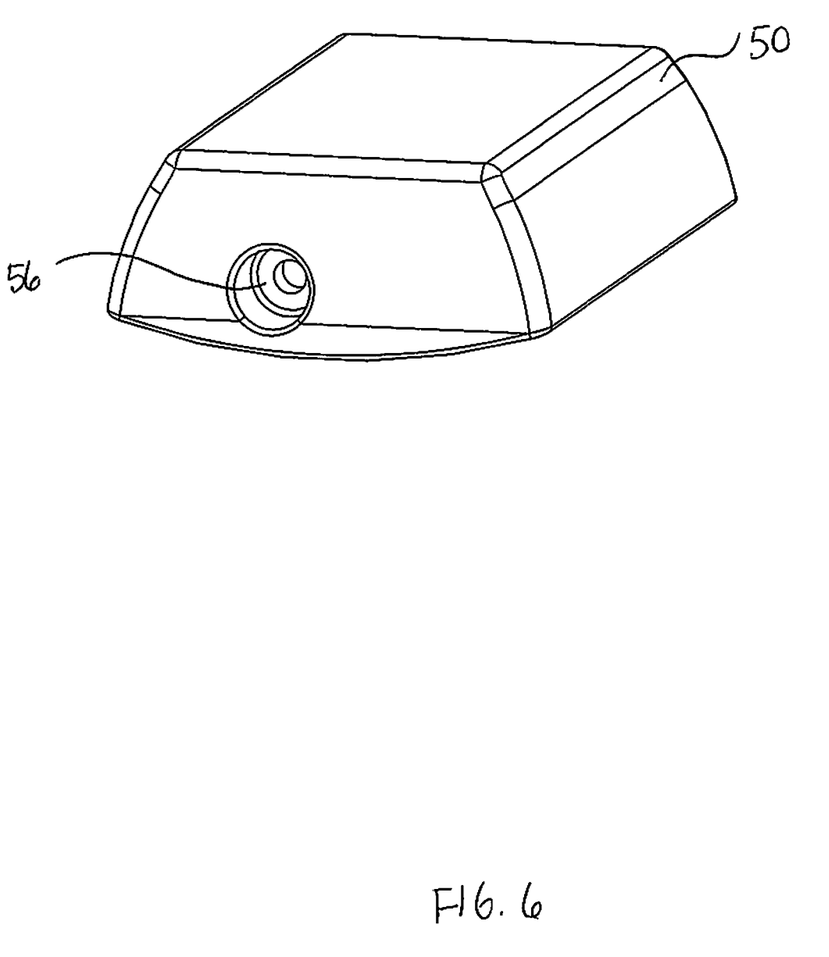
FIG. 6 is a side perspective view of a lug-receiving cap having recessed side surfaces to accommodate a bolt.
Figure 7:
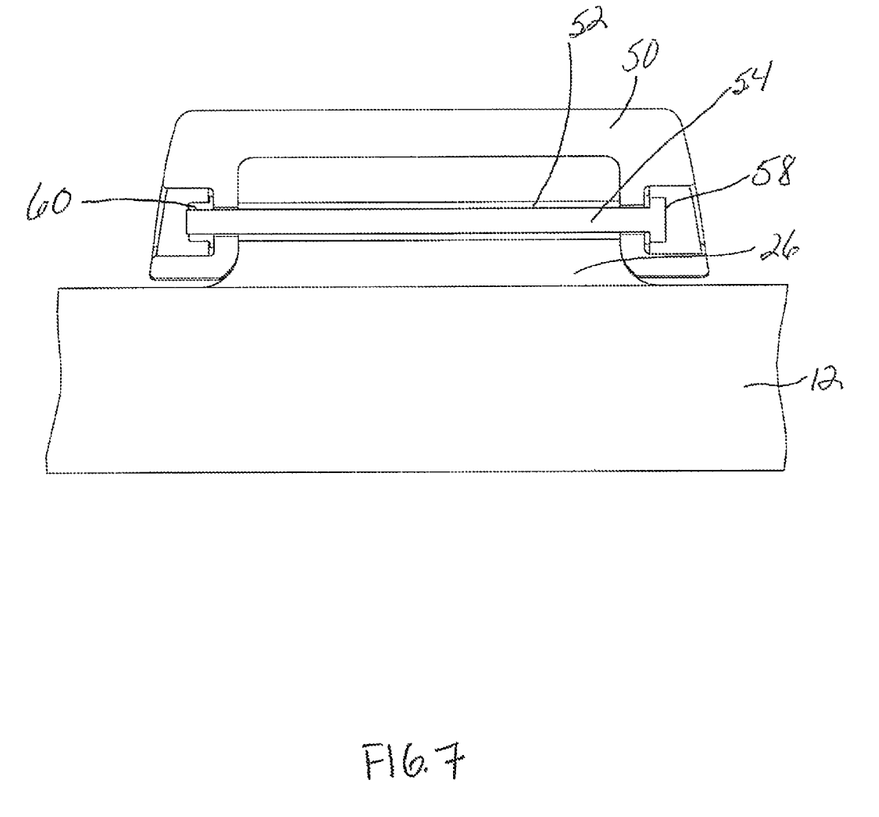
FIG. 7 is a cross-sectional view of the wheel-engaging lug of FIG. 5 taken along section line 5-5.
Figure 8:
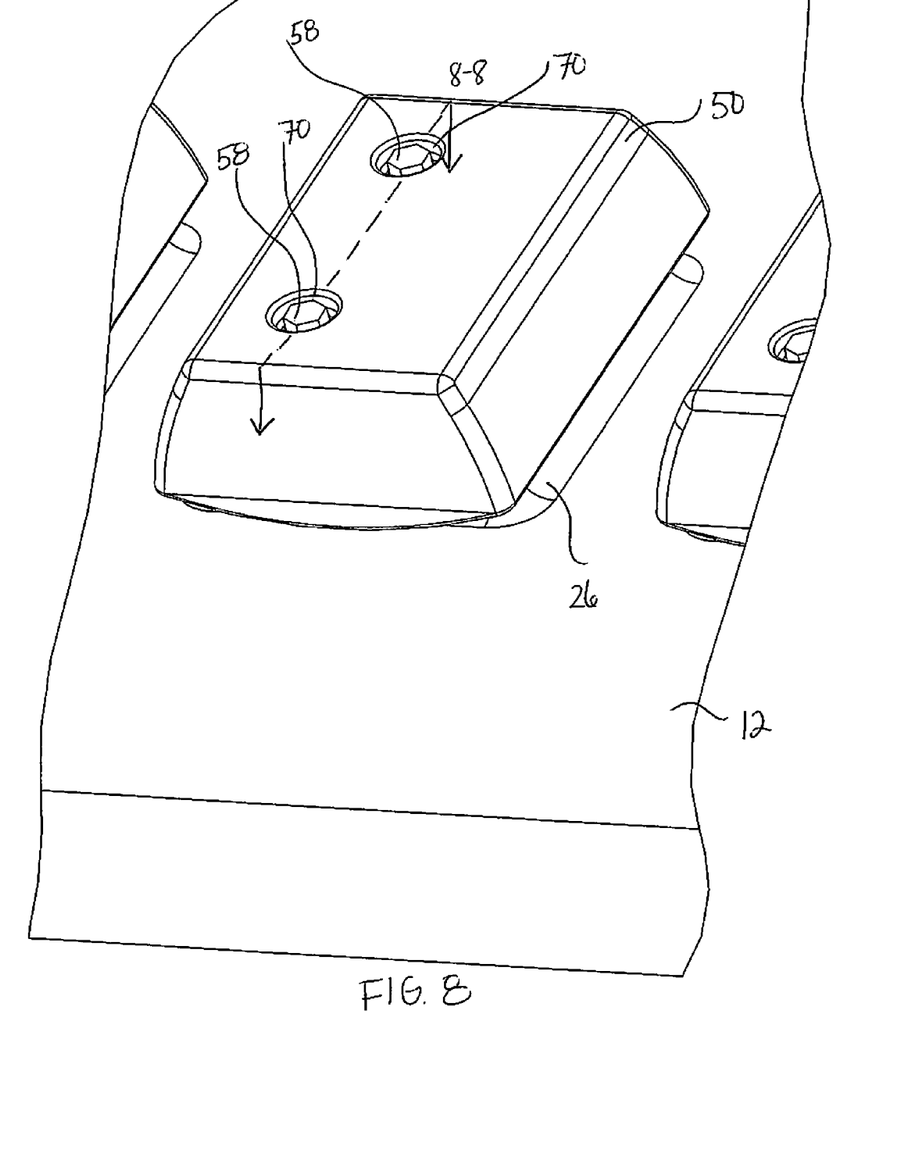
FIG. 8 is a top perspective view of a wheel-engaging lug having a lug-receiving cap placed thereover and being secured by a U-shaped member and bolts.
Figure 9:
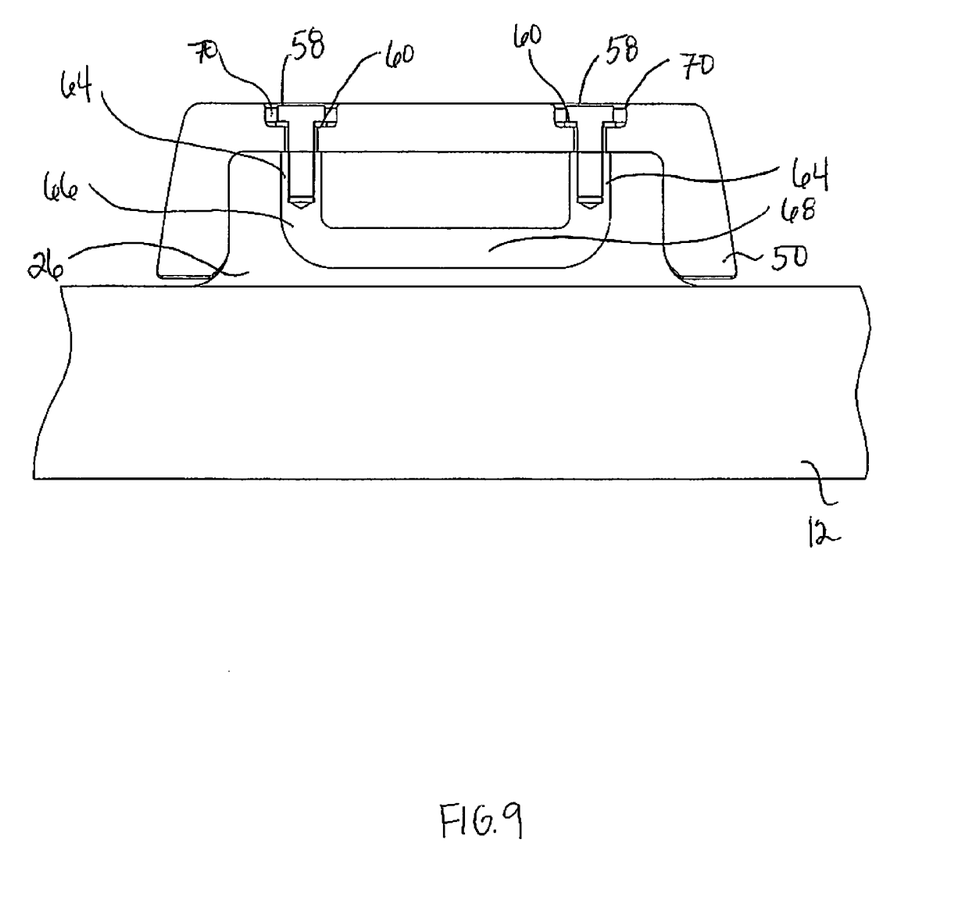
FIG. 9 is a cross-sectional view of the wheel-engaging lug of FIG. 8 taken along section line 8-8.
Figure 10:
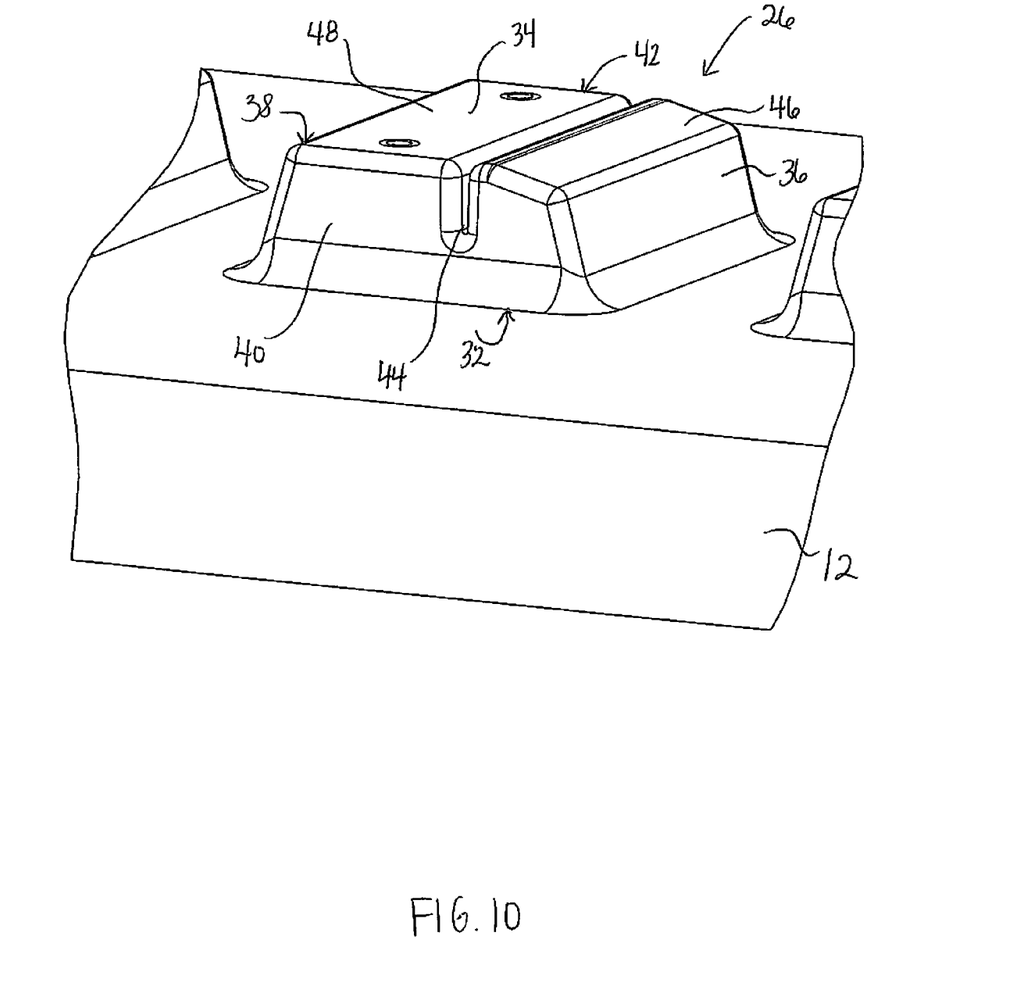
FIG. 10 is a side perspective view of the wheel-engaging lug of FIG. 8 with the lug-receiving cap removed.
Figure 11:
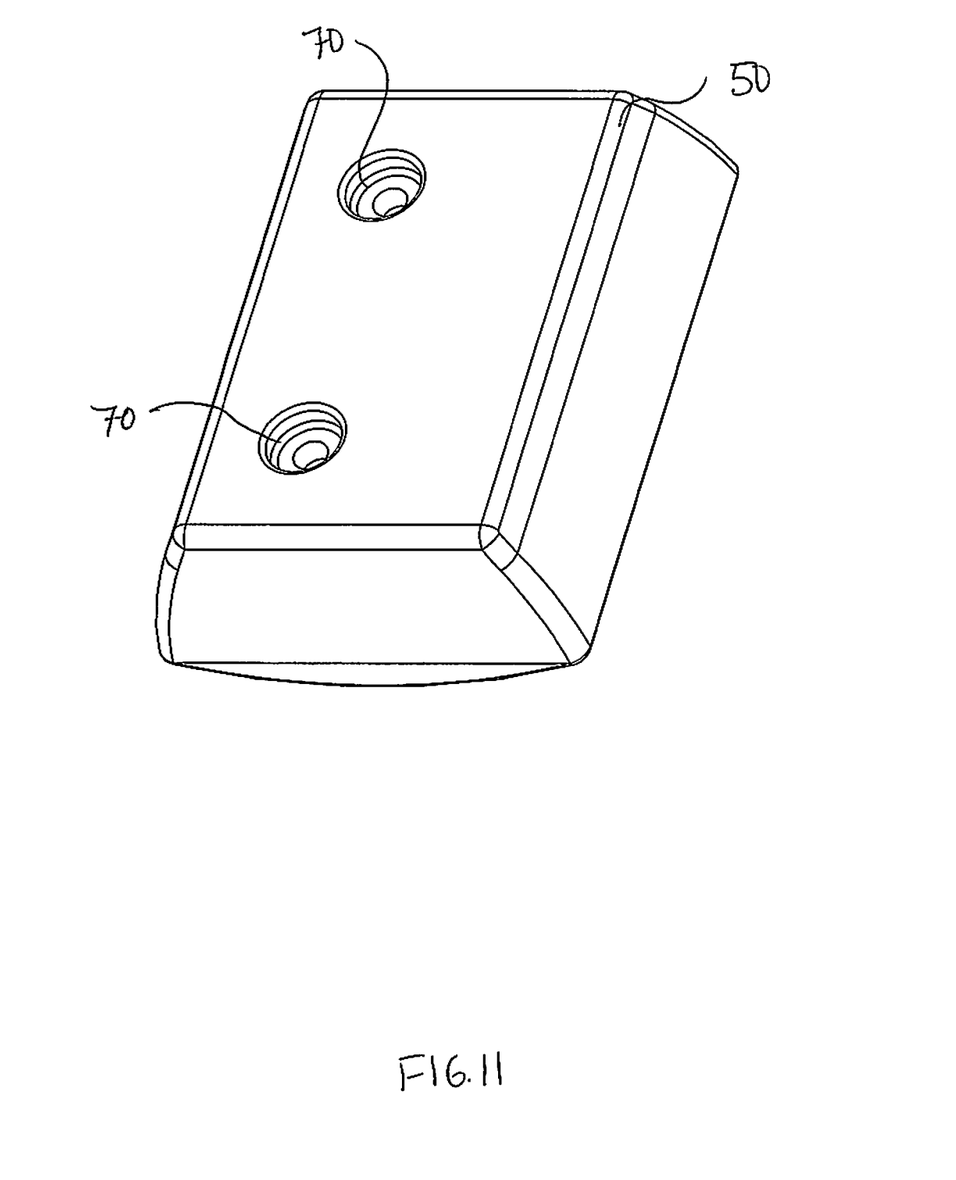
FIG. 11 is a side perspective view of a lug-receiving cap having recessed openings to accommodate a bolt or other securement device.

As shown in FIGS. 5-7, the mechanical means may include a bolt-receiving insert 52, sometimes referred to as a bushing, which extends through lug 26 from one side to the other 40, 42 in an orientation that is substantially parallel to flex-groove 44. Bolt-receiving insert 52 is of a hard, preferably metal, material and may include interior and/or exterior threads. Bolt-receiving insert 52 reduces the strain on lug 26. A bolt 54 may extend through lug 26 from one side to the other 40, 42 so as to secure cap 50 to lug 26. Lug-receiving cap 50 has side surfaces 56 each of which may be recessed to accommodate the bolt-head 58 and a nut 60 or other bolt connector at the other end thereof, as shown.

Alternatively, as shown in FIGS. 8-11, the mechanical means may include a molded-in member which has securement rods 64 that extend toward distal surface 34. Molded-in member may include internal and/or external threads. Molded-in member may be any suitable attachment device such as, for example, a U-shaped member 66 which extends radially inwardly of lug 26. U-shaped member 66 includes two securement rods which extend toward distal surface 34 and an integrally formed cross portion 68. U-shaped member 66 may be molded into one of portions 46, 48 of lug 26 in an orientation that is substantially parallel to flex-groove 44. Other shapes are possible which could include a plurality of securement rods which extend toward the distal surface, for example a W-shaped member (not shown) having three securement rods. Lug-receiving cap may have recessed openings 70 engaging the ends of U-shaped member 66.

Figure 12:
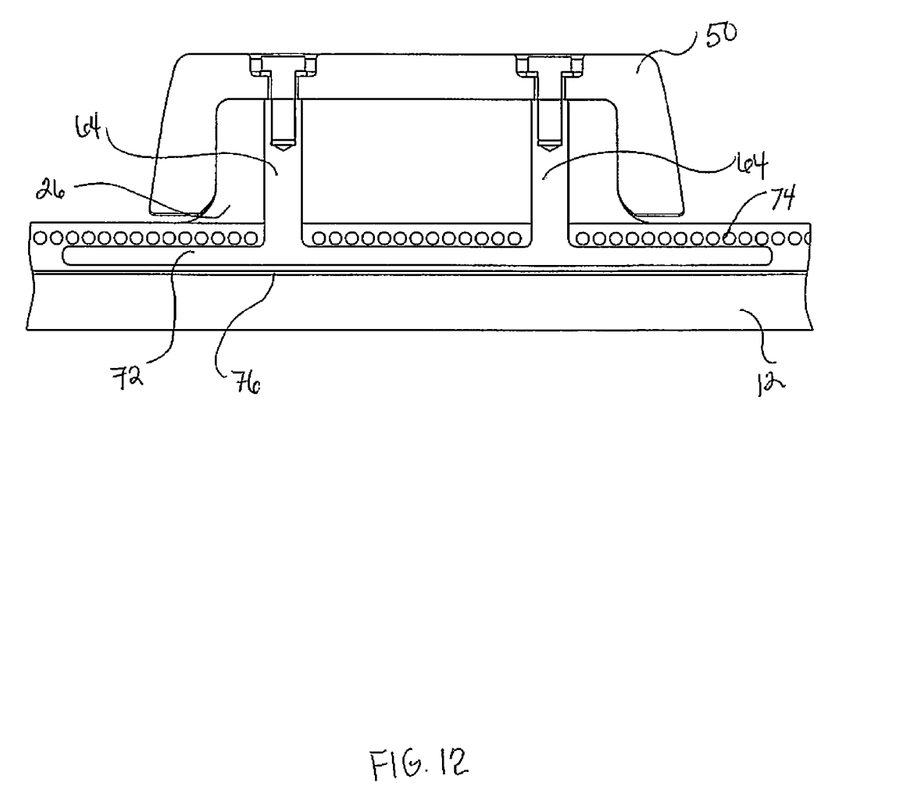
FIG. 12 is a cross-sectional view of a wheel-engaging lug wherein the securement rods extend through the inner surface of the track and terminate in an anchor member that is molded into the track
Figure 13:
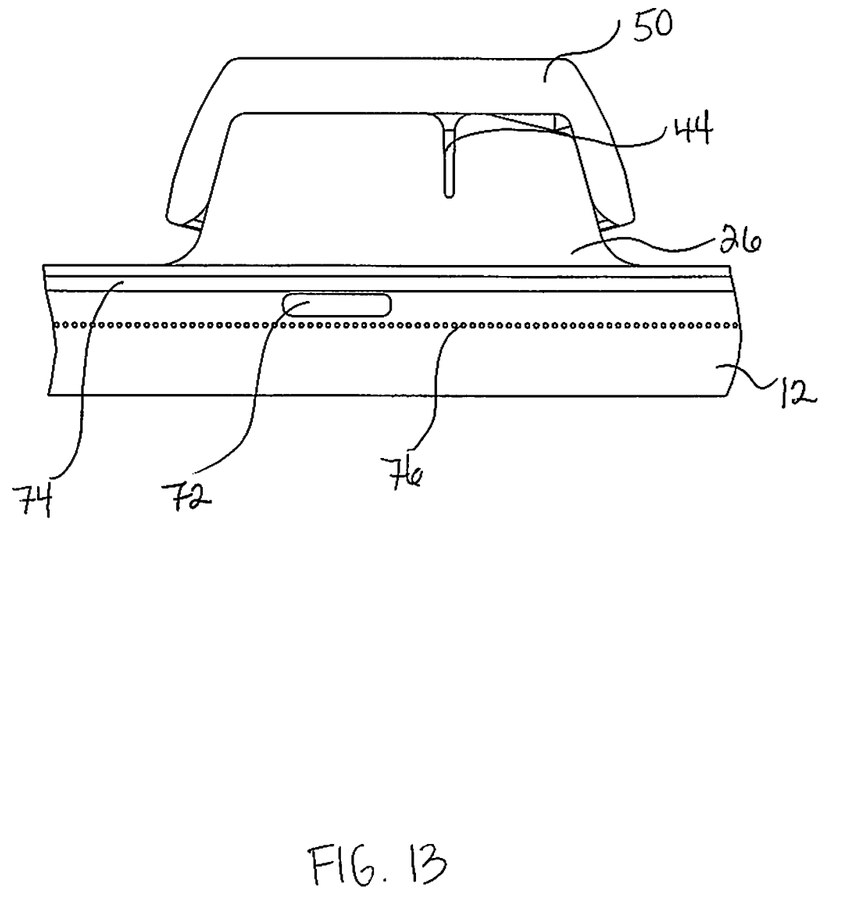
FIG. 13 is a side view of the wheel-engaging lug of FIG. 12.

Referring next to FIGS. 12 and 13, the track includes conventional elements, such as a primary continuous longitudinal steel cable and a series of other cable plies placed within the thickness of the track carcass. The cables facilitate flexibility and also provide longitudinal strength and resistance under load. As shown, the mechanical means may also include securement rods which extend through the proximal end of the lug and through the inner surface of the track. The rods may terminate in a molded-in anchor member 72 in the track. Anchor member 72 may be positioned between the primary longitudinal cable 74 in the track and a cable ply 76 in the track. Anchor member 72 is embedded in track 12 carcass and adds rigidity thereto. Anchor member 72 also increases load-sharing in a section of track 12 which generally experiences the highest unit-loading.

Lug-receiving cap 50 may be made from a number of suitable materials. When choosing such a suitable material, shear strength, flexural modulus and torsional stiffness are factors to consider. Shear strength is the maximum load required to shear a specimen in such a manner that the resulting pieces are completely clear of one another. Torsional stiffness is the resistance to strain caused by twisting a material. The material should feature sufficient strength to resist shearing and sufficient ductility so as not to become brittle, but not so much flexibility that the overall strength of cap 50 is compromised.

A suitable material for cap 50 is one that includes a thermoplastic elastomer which increases the useful life of lugs 26 by minimizing shearing forces and torsional forces on lugs 26 of track 12. It is also possible to use a material such as carbon fiber materials, ductile metals and nanomaterials for forming cap 50.

Many different kinds of thermoplastic elastomers would be suitable for use in forming the cap. For example, any of nylon, polypropylene, polyethylene, polyamide, polyester, polycarbonate and polysulphone with appropriate qualities are acceptable. In general, material having a tensile strength of at least about 5800 psi, elongation at break of less than about 300%, compression strength of greater than about 3000 psi, shear strength of at least about 4800 psi and a maximum service temperature of at least 180° F. are preferred.

Nylon are the preferred material because of their strength, stiffness and dimensional stability. Nylon has the highest tensile strength rating at 12,000 psi, followed by polyesters and polycarbonates at 8,000 psi and polypropylene at 4,000 psi. Also, creep is substantially reduced and molding precision is higher with nylon materials. Nylon has the additional benefit of having low moisture absorption so that nylon parts are less susceptible to warping. An example of a commercially-available nylon material is Nycast® XHA which is available from Cast Nylons Limited. Nylon 6-6 is a particularly strong choice for a cap material having high strength and chemical resistance properties. Nylon 6-6 also has good abrasion resistance, a low coefficient of friction, and good resistance to gasoline and oil.

Fillers are preferably used in the cap materials to improve the physical properties of thermoplastic elastomers. For example, most effective are silane treated glass fibers (at 40%) that exhibit two-and-a-half times greater tensile and Izod impact strength, four times greater flexural modulus and only one-fifth of the tensile creep. Another filler that has been used is microflex talc hydrated magnesium silicate at a 40% level. However, physical properties are about 20% lower than seen in nylon reinforced with glass fibers. Glass-reinforced nylons combine the good properties of nylon with the high strength properties of glass fibers. One such commercially available glass-reinforced nylon material is Verton composite RF-700-10 EM HS which is available through SABIC Innovative Plastics.

In use of lugs 26 according to the foregoing description, it will be appreciated that more of the total circumference of track 12 is covered with lugs 26 than with use of conventional lugs. This is so because the width of lugs 26 as described herein is nearly one and a half to two times as wide (along the long axis of each lug) as conventional lugs, and the lugs of the present invention are, for example, more square shaped than rectangular shaped as seen in conventional tracks. In other words, the present invention facilitates more lug 26 coverage along the circumference of track 12, but with fewer lugs 26. Because more of the total circumference is covered with lugs 26, side loading on individual lugs 26 is reduced. For example, in a conventional track of 252 inches, 42 lugs may be used. Here, using lug 26 having split-groove 44 requires fewer lugs 26 because lugs 26, are longer around track 12 circumference. In one example, with a 252 inch track, as few as twenty-eight lugs may be used with a nine inch pitch.

The general method for prolonging the useful life of a continuous flexible track 12 which extends about a plurality of aligned wheels on a vehicle or track module, as shown for example in FIG. 1, follows. A track 12 is formed, track 12 having an outer ground-engaging surface 24 and an inner wheel-engaging surface 24. Inner wheel engaging surface 24 of track 12 has a plurality of lugs 26, as described above, including flex-groove 44 improvement as described above. With such an exemplary track 12 having been formed, a lug-receiving cap 50 is then placed over each lug 26. Cap 50 is replaceably secured with respect to its respective lug 26. Then, after a period of track 12 use, lug-receiving cap 50 is detached and replaced with a new lug-receiving cap when the old cap is worn or damaged.

While the principles of the invention have been shown and described in connection with specific embodiments, it is to be understood that such embodiments are by way of example and are not limiting.

The invention claimed is:

1. In a continuous flexible track for extending about a plurality of aligned wheels on a vehicle or track module, the track including an outer ground-engaging surface and an inner wheel-engaging surface having inwardly-projecting wheel-engaging lugs, each lug having a proximal end, a distal surface, front and back surfaces and opposite side surfaces, the improvement comprising:
the lug defining a flex-groove extending between the side surfaces and from the distal surface toward the proximal end, thereby dividing the lug into two portions to allow around-wheel hinging motion;
a lug-receiving cap over and replaceably secured with respect to each lug by mechanical means including a U-shaped member having securement rod ends extending to the distal surface and securement devices engage the securement rod ends, the U-shaped member being molded into one of the portions of the lug in an orientation substantially parallel to the flex-groove;
the lug-receiving cap having recessed openings accessing the U-shaped member securement rod ends; and
the securement devices being at the recessed openings engaging the ends of the U-shaped member.

2. The continuous flexible track of claim 1 wherein each lug has a height and the flex-groove extends toward the proximal end by a distance such that the depth of the flex-groove is from about 40% to about 90% of the lug height.

3. The continuous flexible track of claim 2 wherein the depth of the flex-groove is from about 50% to about 80% of the lug height.

4. The continuous flexible track of claim 1 wherein the lug-receiving cap is secured directly to one of the two lug portions.

5. The continuous flexible track of claim 1 wherein the lug-receiving cap is formed from a material comprising one of a thermoplastic elastomer, ductile metal, carbon fiber material and nanomaterial.

6. The continuous flexible track of claim 5 wherein the thermoplastic elastomer includes at least one selected from the group comprising nylon, polypropylene, polyethylene, polyamide, polyester, polycarbonate and polysulphone.

7. The continuous flexible track of claim 6 wherein the thermoplastic elastomer material includes nylon 6-6.

8. The continuous flexible track of claim 6 wherein the thermoplastic elastomer includes between about 30% and about 60% glass-reinforced nylon.

9. The continuous flexible track of claim 5 wherein the thermoplastic elastomer has a tensile strength of between about 5800 psi and about 38,000 psi.

10. A track apparatus comprising:
a drive wheel engaged with a continuous flexible track including an outer ground-engaging surface and an inner wheel-engaging surface having inwardly projecting wheel-engaging lugs;
each lug having a proximal end, a distal surface, front and back surfaces and opposite side surfaces, the lug defining a flex-groove extending between the side surfaces and from the distal surface toward the proximal end, thereby dividing the lug into two portions;
a lug-receiving cap over and replaceably secured with respect to each lug by mechanical means including a U-shaped member having ends extending to the distal surface and securement devices engage the ends, the U-shaped member being molded into one of the portions of the lug in an orientation substantially parallel to the flex-groove;
the lug-receiving cap having recessed openings accessing the U-shaped member ends;
at least one idler wheel engaging the lugs projecting from the inner wheel-engaging surface; and
the securement devices being at the recessed openings engaging the ends of the U-shaped member,
whereby, as the lugs travel about the drive wheel and the idler wheel(s), the flex-groove facilitates around-wheel hinging motion thereby increasing the life of the track.

11. The continuous flexible track of claim 10 wherein each lug has a height and the flex-groove extends toward the proximal end by a distance such that the depth of the flex-groove is from about 40% to about 90% of the lug height.

12. The continuous flexible track of claim 11 wherein the depth of the flex-groove is from about 50% to about 80% of the lug height.

13. The continuous flexible track of claim 10 wherein the lug-receiving cap is secured directly to one of the two lug portions.

14. The continuous flexible track of claim 10 wherein the lug-receiving cap is formed from a material comprising one of a thermoplastic elastomer, ductile metal, carbon fiber material and nanomaterial.

15. The continuous flexible track of claim 14 wherein the thermoplastic elastomer material includes at least one selected from the group comprising nylon, polypropylene, polyethylene, polyamide, polyester, polycarbonate and polysulphone.

16. The continuous flexible track of claim 15 wherein the thermoplastic elastomer material includes nylon 6-6.

17. The continuous flexible track of claim 15 wherein the thermoplastic elastomer includes between about 30% and about 60% glass-reinforced nylon.

18. The continuous flexible track of claim 14 wherein the thermoplastic elastomer has a tensile strength of between about 5800 psi and about 38,000 psi.

\* \* \* \* \*